United States Patent [19]

Voldal

[11] Patent Number: 5,745,570
[45] Date of Patent: Apr. 28, 1998

[54] OBJECT-ORIENTED PROGRAMMING ENVIRONMENT THAT PROVIDES OBJECT ENCAPSULATION VIA ENCRYPTION

[75] Inventor: Erik Edward Voldal, Rochester, Minn.

[73] Assignee: International Business Machines Corporation, Armonk, N.Y.

[21] Appl. No.: 632,299

[22] Filed: Apr. 15, 1996

[51] Int. Cl.$^6$ ........................................... H04L 9/00
[52] U.S. Cl. .................. 380/4; 380/9; 380/23; 380/25; 380/49
[58] Field of Search .............. 380/4, 9, 23, 25, 380/49, 50, 59; 395/614, 683, 604

[56] References Cited

U.S. PATENT DOCUMENTS

| | | |
|---|---|---|
| 4,120,030 | 10/1978 | Johnstone ................................. 380/4 |
| 4,941,175 | 7/1990 | Enescu et al. . |
| 4,953,209 | 8/1990 | Ryder, Sr. et al. . |
| 5,051,898 | 9/1991 | Wright et al. ........................... 395/604 |
| 5,075,847 | 12/1991 | Fromme . |
| 5,301,284 | 4/1994 | Esters et al. . |

*Primary Examiner*—Bernarr E. Gregory
*Attorney, Agent, or Firm*—Steven W. Roth

[57] ABSTRACT

This invention relates in general to object-oriented encapsulated enforcement mechanisms. In particular, a hardware independent object encapsulation enforcement mechanism is disclosed herein. The object encapsulation enforcement mechanism of the present invention uses encryption technology to ensure that data controlled by an object is accessed solely through use of the object's method programs. When an object is instantiated, the virtual address used to refer to the object is encrypted before it is returned to the instantiating application program. When access to a previously instantiated object is requested, the object encapsulation enforcement mechanism decrypts the presented object address and passes the address to the identified method program, thereby ensuring that only object method programs have access to data controlled by the object.

20 Claims, 3 Drawing Sheets

OBJECT-ORIENTED PROGRAMMING ENVIRONMENT THAT PROVIDES OBJECT ENCAPSULATION VIA ENCRYPTION

FIELD OF THE INVENTION

This invention relates to the data processing field. More specifically, this invention relates to object encapsulation within an object-oriented programming environment.

BACKGROUND OF THE INVENTION

The development of the EDVAC computer system of 1948 is often cited as the beginning of the computer era. Since that time, computer systems have found their way into just about every aspect of the American life style. One reason for this proliferation is the ability of computer systems to perform a variety of tasks in an efficient manner. The mechanisms used by computer systems to perform these tasks are called computer programs.

Like computer systems themselves, the development of computer programs has evolved over the years. The EDVAC system used what was called a "one address" computer programming language. This language allowed for only the most rudimentary computer programs. By the 1960s, improvements in computer programming languages led to computer programs that were so large and complex that it was difficult to manage and control their development and maintenance.

Hence, in the 1970s, focus was directed away from developing new programming languages towards the development of programming methodologies and environments which could better accommodate the increasing complexity and cost of large computer programs. One such methodology is the Object Oriented Programming (OOP) approach. OOP advocates claim that this approach to computer programming can improve the productivity of computer programmers by as much as twenty-five fold. Hence, while it has been some time since OOP technology was originally developed, it is currently seen as the way of the future.

Not surprisingly, objects are central to OOP technology. Objects can be thought of as autonomous agents which work together to perform the tasks required of the computer system. A single object represents an individual operation or a group of operations that are performed by a computer system upon information controlled by the object. The operations of objects are called "methods" and the information controlled by objects is called "object data" or just "data." Methods and object data are said to be "encapsulated" in the object. The way an object acts and reacts relative to other objects is said to be its "behavior." Since the proper function of the computer system depends upon objects working together, it is extremely important for each object to exhibit a consistent behavior.

When a method of one object needs access to the data controlled by a second object, it is considered to be a client of the second object. To access the data controlled by the second object, one of the methods of the client (i.e., a client method) will call or invoke the second object to gain access to the data controlled by that object. One of the methods of the called object (i.e., a server method in this case) is then used to access and/or manipulate the data controlled by the called object. Limiting access to the called object's own methods is critical because each object's ability to exhibit a consistent behavior depends on its ability to prevent the methods of other objects from directly accessing and manipulating its data. Indeed, limiting access to the called object's own methods is so critical that the whole OOP methodology breaks down if this encapsulation is not preserved.

One mechanism for enforcing object encapsulation is presented in the copending, commonly assigned patent application having the Ser. No. 08/336,581. While the mechanism described in the copending patent application is an excellent solution to the problem of object encapsulation enforcement, the mechanism depends on the existence of specialized hardware that provides object based memory protection.

Without a hardware independent object encapsulation enforcement mechanism, the inability to guarantee object encapsulation will continue to limit the benefits of OOP.

SUMMARY OF THE INVENTION

A hardware independent object encapsulation enforcement mechanism is disclosed herein. The object encapsulation enforcement mechanism of the present invention uses encryption technology to ensure that data controlled by an object is accessed solely through use of the object's method programs. When an object is instantiated, the virtual address used to refer to the object is encrypted before it is returned to the instantiating application program. When access to a previously instantiated object is requested, the object encapsulation enforcement mechanism decrypts the presented object address and passes the address to the identified method program, thereby ensuring that only object method programs have access to data controlled by the object.

DESCRIPTION OF THE PREFERRED EMBODIMENT

Overview

For those readers who are not experts in computer system memory organization or with the creation and use of object-oriented objects, a brief overview of these topics is presented here. Those readers who are familiar with computer system memory organization and object addressing should proceed to the Detailed Design section of this patent. The Detailed Design section immediately follows this Overview section.

Computer System Memory Organization

As is well known, information (called data) is stored in the computer system's memory. Computer system memory is generally categorized into two types, "main memory" and "auxiliary storage." Computer system information is located using what are called "memory addresses." Information stored in main memory is located via addresses known as real addresses, while information stored in auxiliary storage is located in a way that is specific to the particular type of auxiliary storage device. In general, main memory is used by the computer system to store information that is of current interest to the programs executing on the computer system's processor. Auxiliary storage, on the other hand, is used to store information that is not currently needed by the computer system's programs.

Over the years, computer system designers have created numerous types of addressing schemes. While these addressing schemes are quite complicated and vary to a large degree, most modern day addressing schemes share the concept of "virtual addressing." At the most fundamental level, virtual addressing allows most programs to operate without having to understand whether needed information is stored in main memory or in auxiliary storage. In other words, virtual addressing allows programs to locate and access needed information through a single virtual address, regardless of whether the information is actually stored in main memory or in auxiliary storage.

Object Creation and Access

Fundamentally, objects are created and accessed in the same way as any other information-oriented, computer system entity (i.e., as has just been described in the discussion of computer system memory organization). However, there are a few subtleties about object creation and access that bear explanation. When a program needs to create an object, it does so by requesting main memory space from the computer system's operating system. The operating system responds by first allocating the space needed for the object and then by returning the virtual address associated with the beginning of that space. This address then becomes the object's address, and of course, the address that clients use to gain access to the object.

DETAILED DESIGN

Figure 1:
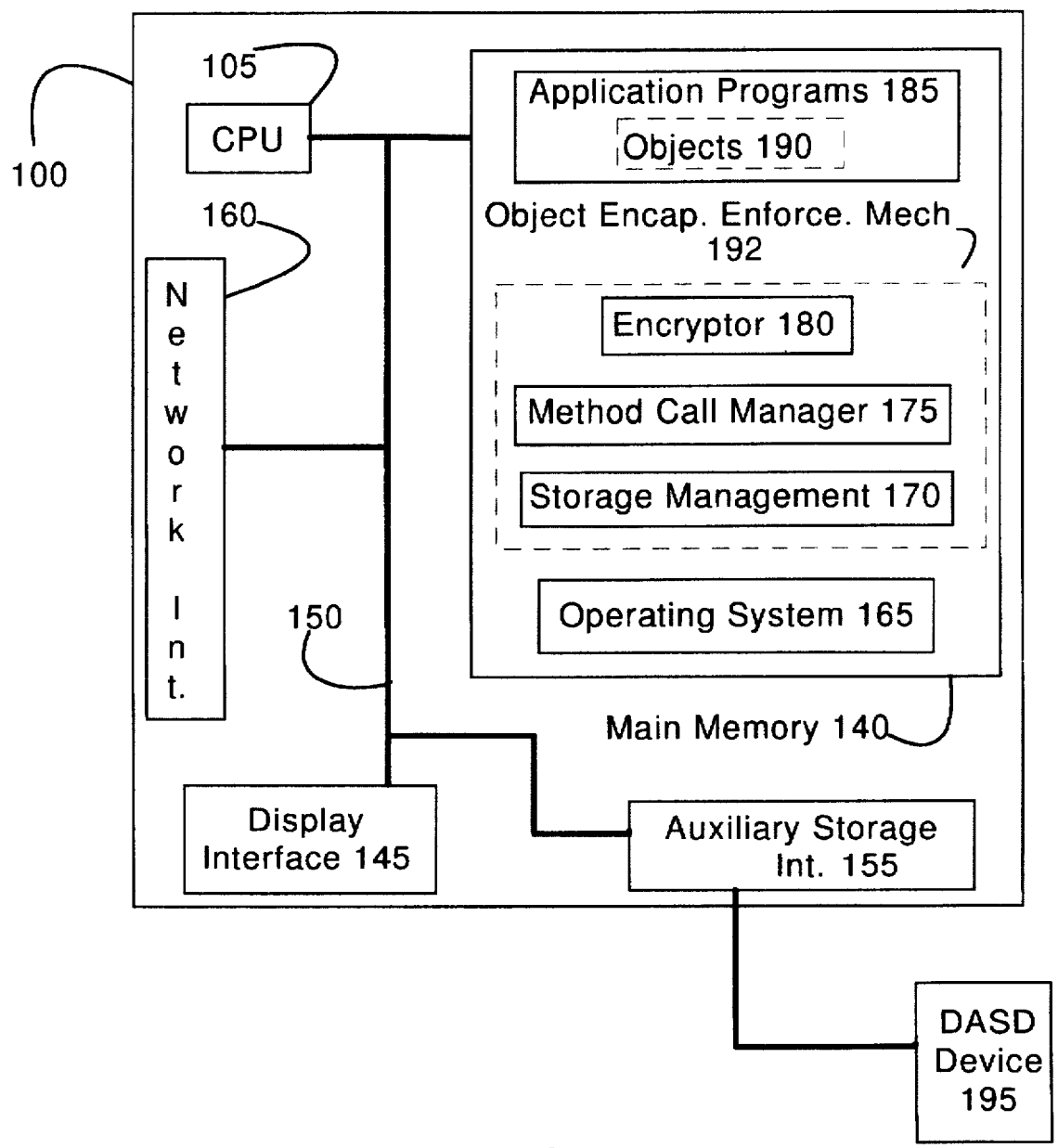
FIG. 1 is a block diagram of the computer system of the present invention.

Turning now to the drawings. FIG. 1 shows a block diagram of the computer system of the present invention. The computer system of the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in the exploded view of FIG. 1, computer system 100 comprises main or central processing unit (CPU) 105 connected to main memory 140, terminal interface 145, mass storage interface 155, and network interface 160. These system components are interconnected through the use of system bus 150. Auxiliary storage interface is used to connect mass storage devices (such as DASD device 195) to computer system 100.

Although computer system 100 is shown to contain only a single main CPU and a single system bus, those skilled in the art will appreciate that the present invention may be practiced using a computer system that has multiple CPUs and/or multiple buses.

Computer system 100 utilizes well known virtual addressing mechanisms that allow the programs of computer system 100 to behave as if they have access to a large, single storage entity instead of access to multiple, smaller storage entities such as main memory 140 and DASD device 195. Therefore, while application programs 185, object encapsulation enforcement mechanism 192, and operating system 165 are shown to reside in main memory 140, those skilled in the art will recognize that these programs are not necessarily all completely contained in main memory 140 at the same time. (It should also be noted that the term "computer system memory" is used herein to generically refer to the entire virtual memory of computer system 100.)

Application programs 185 are further shown to contain objects 190. As described in the Background section of this patent, objects 190 work together to perform the tasks required of the computer system. It should be noted that the statement of whether an object is a client object or a server object is one of relativity. In other words, an object that is said to be a client object relative to another object because its methods call those of the server object may well itself be a server object relative to other objects (i.e., because methods of those other objects call its methods). It should also be noted that the advantages of the mechanisms of the present invention have broader applicability than just to pure object-oriented environments (i.e., those that are made up solely of objects). One example is the case where standard procedural programs are used to access data controlled by objects. Accordingly the word "client" should be taken to refer to any programming entity (procedural, object-oriented, or otherwise) that seeks to gain access to the data controlled by an object.

Object encapsulation enforcement mechanism 192 comprises encryptor 180 method call manager 175, and storage management mechanism 170. Encryptor 180 is used to encrypt and decrypt object addresses that are respectively passed to it by storage management 170 or by method call manager 175. The AS/400 computer system of preferred embodiment provides encryption capability through an application programming interface (API) called CIPHBER. The CIPHER API uses the ANSI data encryption algorithm, which is standard in the industry; however, those skilled in the art will appreciate that the spirit and scope of the present invention is not limited to any one encryption mechanism. Indeed, the mechanisms of the present invention will work with any encryption mechanism that is capable of encrypting the object addresses used by particular computer system at issue.

Method call manager 175 is used in the preferred embodiment as a supervisory mechanism for controlling client calls to objects. Though method call manager 175 is shown as a separate entity to highlight its functionality and to best explain the mechanisms of the present invention, method call manager 175 can also be thought of as part of operating system 165.

Storage management 170 is the mechanism responsible for controlling and maintaining the virtual address space of computer system 100. Though storage management 170 is shown as a separate entity to highlight its functionality and to best explain the mechanisms of the present invention, storage management 170 can also be thought of as part of operating system 165. It should also be understood that the term "storage management mechanism" is not intended to somehow narrow the scope of the present invention and that all operating systems include an entity or group of entities that is/are responsible for managing computer system memory.

Operating system 165 is a multitasking operating system known in the industry as OS/400; however, those skilled in the art will appreciate that the spirit and scope of the present invention is not limited to any one operating system.

The interfaces (called input/output processors in AS/400 terminology) that are used in the preferred embodiment each include separate, fully programmed microprocessors that are used to off-load compute-intensive processing from CPU 105. However, those skilled in the art will appreciate that the present invention applies equally to computer systems that simply use I/O adapters to perform similar functions.

Terminal interface 145 is used to directly connect one or more terminals to computer system 100. These terminals, which may be non-intelligent or fully programmable workstations, are used to allow system administrators and users to communicate with computer system 100.

Network interface 160 is used to connect other computer systems and/or workstations to computer system 100 in networked fashion. The present invention applies equally no matter how computer system 100 may be connected to other computer systems and/or workstations, regardless of whether the connection(s) is made using present-day analog and/or digital techniques or via some networking mechanism of the future. It is also important to point out that the presence of network interface 160 within computer system 100 means that computer system 100 may engage in cooperative processing with one or more other computer systems or workstations. Of course, this in turn means that the programs shown in main memory 140 need not necessarily all reside on computer system 100. For example, one or more programs of application programs 110 may reside on another system and request access to one or more server objects that reside on computer system 100. This cooperative processing could be accomplished through use of one of the well known remote object access mechanisms such as those that are compliant with CORBA's Object Requester/Broker service.

It is important to note that while the present invention has been (and will continue to be) described in the context of a fully functional computer system, that those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disks and CD ROMs and transmission type media such as digital and analogue communications links.

Figure 2:
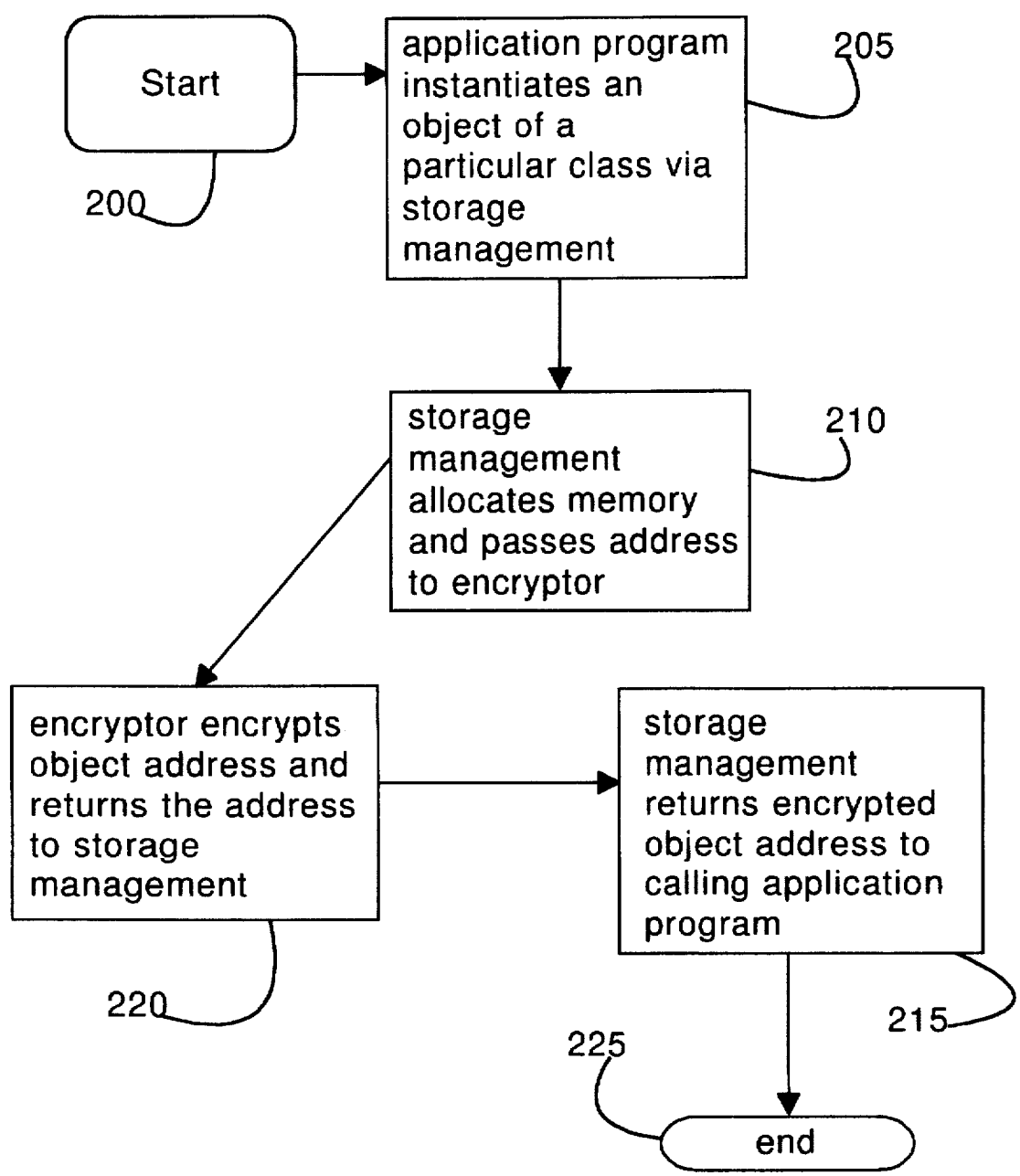
FIG. 2 is a flow diagram that shows steps used to carry out object creation and object address encryption, according to the preferred embodiment of the present invention.

FIG. 2 is a flow diagram that shows steps used to carry out object creation and object address encryption. In block 205, an application program (i.e., one of application programs 185) instantiates an object via interaction with storage management 170. AS/400 computer systems use the virtual memory architecture known in the industry as single level store (SLS). In SLS computer systems, the virtual addresses that are associated with allocated space within computer system memory are said to be persistent, which means that the virtual address used to access an instantiated object never changes. As is well known in the art, other computer system memory architectures do not involve persistent virtual addresses. Instead, virtual address are more transient, which means that multiple accesses to a single object are not always made using the same virtual address. This distinction is discussed here to make clear that the benefits and advantages of the present invention are not limited to an SLS memory architecture. Irrespective of whether an object is instantiated in an SLS environment or in a non-SLS environment, the accessing entity (i.e., the client) must nevertheless access the object via a virtual address. The fact that a virtual address is always used means that there will always be an opportunity to encrypt or decrypt the address, as is taught herein.

When storage management 170 is invoked by an application program [block 205], storage management 170 proceeds to allocate memory within the computer system memory of computer system 100 and pass the virtual address associated with the beginning of this space (i.e., the object address) to encryptor 180 [block 210]. Encryptor 180 then proceeds to encrypt the passed object address and return the encrypted object address back to storage management 170 [block 220]. When storage management 170 receives the object address from storage management 170 it returns the encrypted object address and control of CPU 105 to the instantiating application program [blocks 215 and 220].

Figure 3:
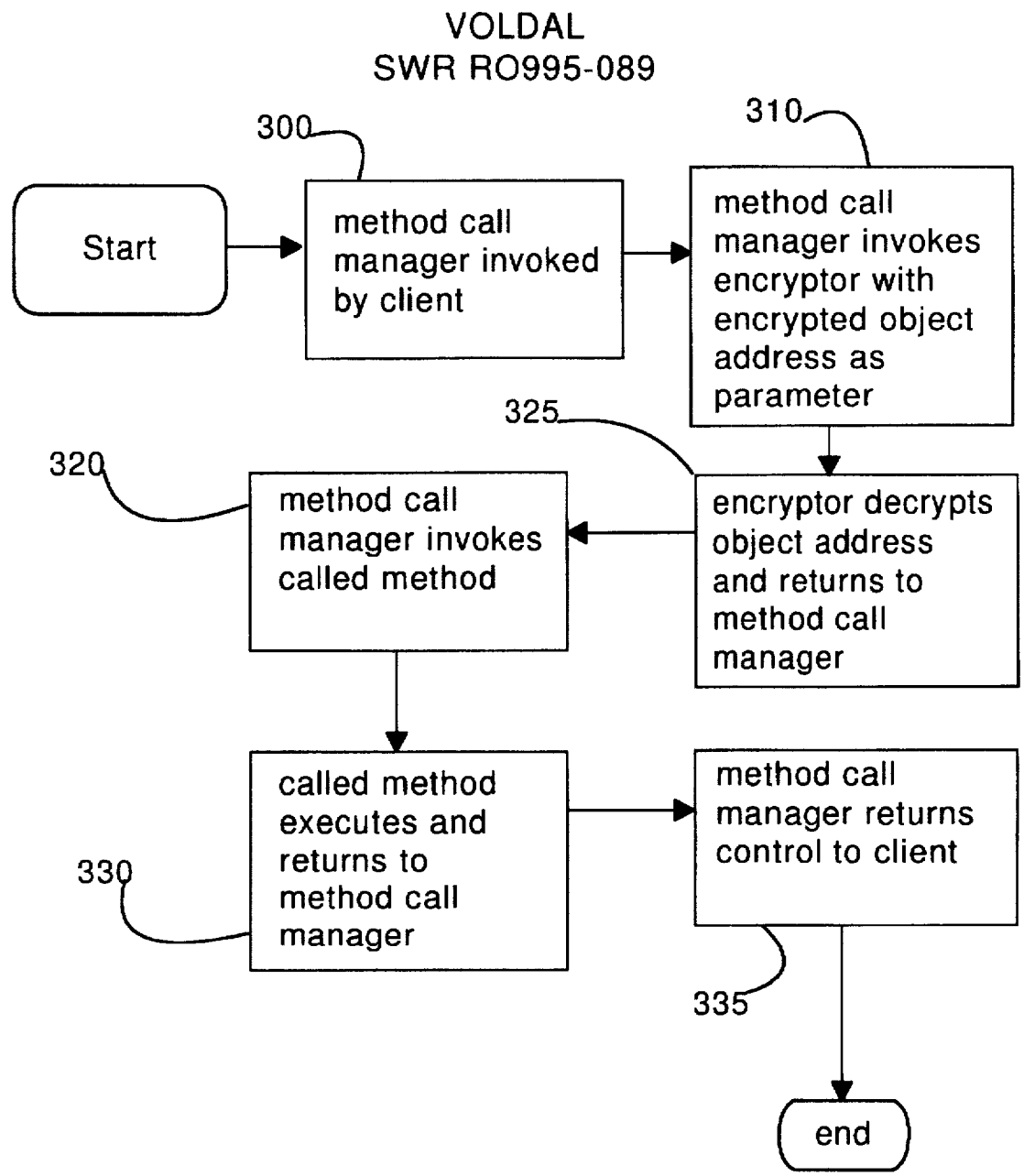
FIG. 3 is a flow diagram that shows steps used to carry out object address decryption and object access, according to the preferred embodiment of the present invention.

FIG. 3 is a flow diagram that shows steps used to carry out object address decryption and object access, according to the preferred embodiment of the present invention. When a client wishes to access the data controlled by a server object, it invokes method call manager 175. When invoking method call manager 175, the client furnishes identification information about which server object method program is to be executed and the object address of the server object itself. As previously mentioned, method call manager 175 is used in the preferred embodiment as a supervisory mechanism to control client calls to server objects. This step is denoted on FIG. 3 as block 300. Method call manager 175 then invokes encryptor 180 and passes encryptor 180 the object address that it received from the client [block 310]. Encryptor 180 responds by decrypting the passed object address and returning the decrypted object address to method call manager 175 [block 325]. Method call manager 175 then invokes the called method using the decrypted object address. Once the called method has finished executing, it returns control to method call manager 175 [block 330]. Method call manager 175 then returns control to the client [block 335].

Advantages

The present invention provides an enhanced mechanism that limits access to object data to only the methods of the subject object. This has the advantageous affect of enforcing object encapsulation.

The present invention also provides an enhanced mechanism for enforcing object encapsulation that does not depend upon specialized hardware or upon any one memory architecture.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A computer system, said computer system comprising:
 a central processing unit;
 a bus;
 computer system memory connected to said central processing unit via said bus;
 application programs, said application programs being stored in said computer system memory for execution on said central processing unit; and
 an object encapsulation enforcement mechanism, said object encapsulation enforcement mechanism being stored in said computer system memory for execution on said central processing unit, said object encapsulation enforcement mechanism enforcing access to server objects by said application programs through encryption of object addresses that are used to address said server objects.

2. The computer system of claim 1 wherein said object encapsulation enforcement mechanism comprises a storage management mechanism that causes said object addresses to be encrypted upon instantiation of said server objects.

3. The computer system of claim 1 wherein said object encapsulation enforcement mechanism comprises a method call manager that causes said object addresses to be decrypted upon access to said server objects by said application programs.

4. A computer system, said computer system comprising:
a central processing unit;
a bus;
computer system memory connected to said central processing unit via said bus; and
a storage management mechanism, said storage management mechanism being stored in said computer system memory for execution on said central processing unit, said storage management mechanism being used to allocate computer system memory for at least one instantiated object and to cause encryption of an object address that refers to said object.

5. A computer system, said computer system comprising:
a central processing unit;
a bus;
computer system memory connected to said central processing unit via said bus; and
a method call manager, said method call manager being stored in said computer system memory for execution on said central processing unit, said method call manager being used to decrypt at least one encrypted object address of a server object when access by at least one application program is requested.

6. A network of computer systems, said network comprising:
a first computer system, said first computer system comprising,
a first central processing unit;
a first bus;
first computer system memory connected to said first central processing unit via said first bus;
a storage management mechanism, said storage management mechanism being stored in said first computer system memory for execution on said first central processing unit, said storage management mechanism being used to allocate computer system memory for at least one instantiated object and to cause encryption of an object address that refers to said object;
a second computer system, said second computer system being connected to said first computer system, said second computer system comprising,
a second central processing unit;
a second bus;
second computer system memory connected to said central processing unit via said second bus; and
a method call manager, said method call manager being stored in said second computer system memory for execution on said second central processing unit, said method call manager being used to decrypt said encrypted object address of said at least one object when access by at least one application program is requested.

7. A computer implemented method for enforcing object encapsulation, said method comprising the steps of:
requesting instantiation of an object, said instantiation being requested by an application program;
allocating computer system memory for said object;
encrypting an object address that refers to said object;
returning said encrypted object address to said application program;
requesting access to said object via a method program of said object;
decrypting said encrypted object address into a decrypted object address and providing said decrypted object address to said method program; and
executing said method program.

8. A computer implemented method for enforcing object encapsulation, said method comprising the steps of:
requesting instantiation of an object, said instantiation being requested by an application program;
allocating computer system memory for said object;
encrypting an object address that refers to said object; and
returning said encrypted object address to said application program.

9. A computer implemented method for enforcing object encapsulation, said method comprising the steps of:
requesting access to an object's data via a method program of said object;
decrypting an encrypted object address into a decrypted object address and providing said decrypted object address to said method program; and
executing said method program.

10. A program product, said program product comprising:
an object encapsulation enforcement mechanism, said object encapsulation enforcement mechanism enforcing access to server objects by application programs through encryption of object addresses that are used to address said server objects; and
signal bearing media bearing said object encapsulation enforcement mechanism.

11. The program product of claim 10 wherein said object encapsulation enforcement mechanism comprises a storage management mechanism that causes said object addresses to be encrypted upon instantiation of said server objects.

12. The program product of claim 10 wherein said object encapsulation enforcement mechanism comprises a method call manager that causes said object addresses to be decrypted upon access to said server objects by said application programs.

13. The program product of claim 10 wherein said signal bearing media is transmission type media.

14. The program product of claim 10 wherein said signal bearing media is recordable media.

15. A program product, said program product comprising:
a storage management mechanism, said storage management mechanism being used to allocate computer system memory for at least one instantiated object and to cause encryption of an object address that refers to said object; and
signal bearing media bearing said storage management mechanism.

16. The program product of claim 15 wherein said signal bearing media is transmission type media.

17. The program product of claim 15 wherein said signal bearing media is recordable media.

18. A program product, said program product comprising:
a method call manager, said method call manager being used to decrypt at least one encrypted object address of a server object when access by at least one application program is requested; and
signal bearing media bearing said method call manager.

19. The program product of claim 18 wherein said signal bearing media is transmission type media.

20. The program product of claim 18 wherein said signal bearing media is recordable media.

* * * * *